March 16, 1937.   R. J. SCULLIN   2,073,907
METHOD OF PREPARING BITUMINOUS CONCRETE PAVING MATERIAL
Filed Dec. 18, 1935
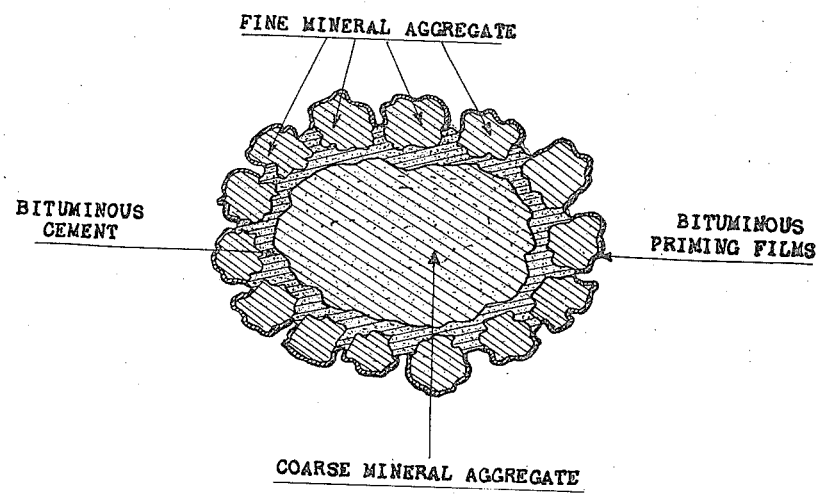
Inventor
R. J. SCULLIN
By H. B. Willson &co.
Attorneys Patented Mar. 16, 1937

2,073,907

UNITED STATES PATENT OFFICE 2,073,907

METHOD OF PREPARING BITUMINOUS CONCRETE PAVING MATERIAL

Richard J. Scullin, Newton, Mass.

Application December 18, 1935, Serial No. 55,127

1 Claim. (Cl. 106—31)

The invention relates to bituminous concrete material for roads, driveways, city streets, sidewalks, tennis courts, etc., and it aims to provide a new and advantageous material and a new method for preparing the same, said material, although consisting of mineral aggregate and bituminous cement to form a dense, stable and well bonded structure when compacted with pressure, being normally loose and substantially non-sticky and being, therefore, easily handled and laid, instead of constituting a sticky gummy mass handled only with great difficulty as bituminous concrete mixtures have heretofore been.

The drawing discloses a sectional view showing one piece of paving material according to the invention.

In carrying out the invention in one advantageous way, I make use of the following ingredients in the stated proportions.

|  | Percent |
|---|---|
| Coarse mineral aggregate | 56 |
| Liquefier | ½ |
| Bitumious cement | 4 |
| Fine mineral aggregate | 38 |
| Liquefied bitumen | 1½ |

The aggregates should be dry and at normal air temperature, preferably 80° to 100° F. and none of the ingredients require heating.

The coarse mineral aggregate is discharged into a mixing machine, for instance, a twin pug mill, and while agitating said coarse aggregate, the liquefier is sprayed or poured in to thoroughly dampen the aggregate. The bituminous cement is then added and the agitation continued to coat all pieces of the coarse aggregate and form a sticky gummy mass, the liquefier merely assisting the cement in adhering to the aggregate. The fine mineral aggregate is now placed in the mixer and the agitation is continued until the previously sticky mass breaks up into individual loose pieces, each having a coating of bituminous cement and coatings of fine aggregate upon the cement coatings segregating them from each other, the appearance at this stage being that of loose uncoated aggregate. The liquefied bitumen is now added and agitation is continued to apply mere bituminous films to the previously exposed surfaces of the fine aggregate, these films being virtually "priming coats" to later facilitate adhesion of the bituminous cement to the film-covered surfaces of the fine aggregate and possessing insufficient thickness and viscosity to cause the coated pieces of aggregate to adhere to each other. In fact, the liquefied bitumen soon assumes a substantially dry non-sticky state. For certain kinds of fine aggregates which are hard to coat, a liquefier may be applied before adding the liquefied bitumen.

The mixture above described may be used at any time after discharge from the machine. This mixture is loose and substantially dry and is easily handled, hauled, shipped, piled, laid, etc., but when it is compacted under pressure it becomes a dense, stable and well bonded structure. The compaction with pressure causes at least partial embedding of the fine aggregate in the bituminous cement coatings and consequent displacement of some of the bituminous cement between the pieces of fine aggregate, and forces some of the fine aggregate pieces of each coating "into mesh" with those of other coatings. The displaced cement of any piece of the material adheres to the displaced cement of the contacting pieces and adheres also to all of the bituminous "priming coats" of the fine aggregate with which it comes in contact. The compacted material is thus tenaciously bonded with the bituminous cement even though prior to compaction, the cement coatings are segregated from each other and cannot, therefore, cause sticking of the coated pieces together.

The ingredients above mentioned are preferably of the following characteristics:—

The mineral aggregate shall consist of crushed stone, slag, gravel, sand or other allied products.

The coarse mineral aggregate shall be that aggregate which is retained on a ¼ inch screen, preferably of a nearly uniform size which shall be determined by the texture desired in the finished pavement. For mixtures requiring close texture, aggregate retained on a ⅛ inch screen shall be included in this class.

The fine mineral aggregate shall consist of that aggregate which passes a ¼ inch screen. When the coarse mineral aggregate includes the aggregate retained on a ⅛ inch screen, the fine aggregate shall be that which passes a ⅛ inch screen.

The bituminous cement shall be oil asphalt or fluxed native asphalt, the penetration of which shall be determined according to the type of aggregate used, and the degree of hardness required in the finished pavement.

The liquefied bitumen shall consist of asphalt emulsion, cutback asphalt or any liquefied asphalt which may be used for this mixture.

The liquefier shall consist of petroleum naphtha or other petroleum distillate.

The following proportions of ingredients mixed as above explained will also give results:

| | Percent |
|---|---|
| Coarse mineral aggregate | 35–70 |
| Volatile liquefier | ½– 1 |
| Asphalt cement | 3– 6 |
| Fine aggregate | 30–60 |
| Liquid asphalt | ½– 3 |

The volatile liquefier may be eliminated during certain seasons of the year.

I claim:—

The method of preparing a bituminous concrete paving material comprising the steps of coating relatively coarse pieces of mineral aggregate with a bituminous cement, covering the bituminous cement coatings on the pieces of coarse aggregate with relatively fine non-powdered bare mineral aggregate to segregate said coarse pieces from each other, and applying quick-drying bituminous priming films to the exposed surfaces of the fine aggregate, said priming films being of such viscosity and thinness as to prevent the fine aggregate coatings from adhering to each other and serving merely to prepare them for subsequent adhesion with the bituminous cement displaced between the fine mineral particles of the various pieces during compaction; whereby a loose substantially dry material is provided which may be easily handled and laid, and the individual coated pieces will become cemented together upon compaction with pressure.

RICHARD J. SCULLIN.